(12) United States Patent
Bartholomew et al.

(10) Patent No.: US 8,636,173 B2
(45) Date of Patent: *Jan. 28, 2014

(54) POINT-OF-SALE BODY POWDER DISPENSING SYSTEM

(75) Inventors: Julie R. Bartholomew, Birmingham, MI (US); Charles P. Hines, Jr., Hamburg, MI (US)

(73) Assignee: Cosmetic Technologies, L.L.C., W. Bloomfield, MI (US)

( * ) Notice: Subject to any disclaimer, the term of this patent is extended or adjusted under 35 U.S.C. 154(b) by 1644 days.

This patent is subject to a terminal disclaimer.

(21) Appl. No.: 11/466,653

(22) Filed: Aug. 23, 2006

(65) Prior Publication Data

US 2008/0047972 A1 Feb. 28, 2008

Related U.S. Application Data

(63) Continuation of application No. 10/848,273, filed on May 18, 2004, now Pat. No. 7,121,429, which is a continuation of application No. 10/437,085, filed on May 13, 2003, now Pat. No. 6,779,686, which is a continuation of application No. 10/151,398, filed on May 20, 2002, which is a continuation of application No. 09/872,929, filed on Jun. 1, 2001, now Pat. No. 6,412,658.

(51) Int. Cl.
*G01F 11/20* (2006.01)

(52) U.S. Cl.
USPC .................................................. 222/1; 141/9

(58) Field of Classification Search
USPC ........ 222/1, 135, 144, 144.5, 137; 141/9, 104
See application file for complete search history.

(56) References Cited

U.S. PATENT DOCUMENTS

| | | |
|---|---|---|
| 967,938 A | 8/1920 | Krause |
| 1,912,899 A | 6/1933 | Johannsen |
| D90,897 S | 10/1933 | Rockola |
| D96,564 S | 8/1935 | Simpkins |
| 2,393,371 A | 1/1946 | Harris |
| 2,417,677 A | 3/1947 | Cohan |
| D192,180 S | 2/1962 | Hodgman |
| D192,301 S | 2/1962 | Schaef |
| 3,024,583 A | 3/1962 | Gastright |
| 3,471,611 A * | 10/1969 | Levine Sol et al. .......... 424/10.2 |
| 3,527,236 A | 9/1970 | Anthony et al. |
| 3,860,015 A | 1/1975 | Tarro |
| D248,693 S | 7/1978 | Housman |
| 4,133,525 A | 1/1979 | Balles et al. |

(Continued)

FOREIGN PATENT DOCUMENTS

| | | |
|---|---|---|
| CA | 98986 | 3/2003 |
| CA | 2400748 | 10/2009 |

(Continued)

OTHER PUBLICATIONS

US 6,568,560, 5/2003, Bartholomew et al. (withdrawn).

(Continued)

*Primary Examiner* — J. Casimer Jacyna
(74) *Attorney, Agent, or Firm* — The Dobrusin Law Firm, P.C.

(57) ABSTRACT

A user interactive custom cosmetic powder color and effects dispensing system and method of doing business.

20 Claims, 7 Drawing Sheets

(56) References Cited

U.S. PATENT DOCUMENTS

| | | | |
|---|---|---|---|
| 4,160,271 | A | 7/1979 | Grayson et al. |
| 4,176,762 | A | 12/1979 | Scalera et al. |
| 4,351,591 | A | 9/1982 | Stockett |
| 4,434,467 | A | 2/1984 | Scott |
| 4,461,401 | A | 7/1984 | Sasnett, Jr. |
| 4,561,850 | A | 12/1985 | Fabbri et al. |
| 4,628,974 | A | 12/1986 | Meyer et al. |
| 4,681,546 | A | 7/1987 | Hart |
| 4,705,083 | A | 11/1987 | Rossetti |
| 4,764,044 | A | 8/1988 | Konose |
| 4,830,218 | A | 5/1989 | Shirkan |
| 4,838,457 | A | 6/1989 | Swahl et al. |
| 4,846,184 | A | 7/1989 | Comment et al. |
| 4,871,262 | A | 10/1989 | Krauss et al. |
| 4,887,410 | A | 12/1989 | Gandini |
| D306,808 | S | 3/1990 | Thomas |
| 4,909,632 | A | 3/1990 | McFarlane |
| 4,947,903 | A * | 8/1990 | Beckwith .................. 141/67 |
| 4,953,985 | A | 9/1990 | Miller |
| 4,966,205 | A | 10/1990 | Tanaka |
| 4,967,938 | A | 11/1990 | Hellenberg |
| 5,042,691 | A | 8/1991 | Maldonado |
| 5,044,520 | A | 9/1991 | Moisan |
| D322,542 | S | 12/1991 | Fontlladosa |
| 5,078,302 | A | 1/1992 | Hellenberg |
| 5,083,591 | A | 1/1992 | Edwards et al. |
| 5,111,855 | A | 5/1992 | Boeck et al. |
| 5,116,134 | A | 5/1992 | Edwards et al. |
| 5,119,973 | A | 6/1992 | Miller et al. |
| D327,695 | S | 7/1992 | Edstrom |
| D327,895 | S | 7/1992 | Edstrom |
| 5,137,367 | A | 8/1992 | Madonia et al. |
| 5,163,010 | A | 11/1992 | Klein |
| 5,163,484 | A | 11/1992 | Howlett et al. |
| 5,193,720 | A | 3/1993 | Mayberry |
| 5,197,802 | A | 3/1993 | Miller et al. |
| 5,203,387 | A | 4/1993 | Howlett et al. |
| 5,267,178 | A | 11/1993 | Berner |
| 5,267,669 | A | 12/1993 | Dixon et al. |
| 5,268,620 | A | 12/1993 | Hellenberg |
| 5,268,849 | A | 12/1993 | Howlett et al. |
| 5,271,527 | A | 12/1993 | Haber et al. |
| 5,271,628 | A | 12/1993 | Okada |
| 5,305,917 | A | 4/1994 | Miller et al. |
| 5,310,257 | A | 5/1994 | Altieri, Jr. et al. |
| 5,311,293 | A | 5/1994 | MacFarlane et al. |
| 5,312,240 | A | 5/1994 | Divone, Sr. et al. |
| 5,313,267 | A | 5/1994 | MacFarlane et al. |
| D347,645 | S | 6/1994 | Miller |
| D347,646 | S | 6/1994 | Mayberry |
| 5,328,057 | A | 7/1994 | Hellenberg et al. |
| D349,506 | S | 8/1994 | Caruso et al. |
| 5,356,041 | A | 10/1994 | Hellenberg |
| 5,361,812 | A | 11/1994 | Arneson et al. |
| 5,368,196 | A | 11/1994 | Hellenberg et al. |
| 5,379,916 | A | 1/1995 | Martindale et al. |
| 5,397,134 | A | 3/1995 | Fishman et al. |
| D357,142 | S | 4/1995 | Jones et al. |
| 5,407,100 | A | 4/1995 | Tracy et al. |
| 5,460,297 | A | 10/1995 | Shannon et al. |
| 5,478,238 | A | 12/1995 | Gourtou et al. |
| D366,304 | S | 1/1996 | Lewis |
| 5,480,288 | A | 1/1996 | Hellenberg et al. |
| 5,495,338 | A | 2/1996 | Gouriou et al. |
| 5,507,575 | A | 4/1996 | Rossetti |
| 5,524,656 | A | 6/1996 | Konarski et al. |
| 5,531,710 | A | 7/1996 | Dang et al. |
| 5,537,211 | A | 7/1996 | Dial |
| 5,549,372 | A | 8/1996 | Lewis |
| D374,677 | S | 10/1996 | Hodson et al. |
| 5,562,109 | A | 10/1996 | Tobiason |
| 5,562,643 | A | 10/1996 | Johnson |
| 5,566,693 | A | 10/1996 | Gunderman et al. |
| 5,612,868 | A | 3/1997 | Off et al. |
| 5,622,692 | A | 4/1997 | Rigg et al. |
| 5,626,155 | A | 5/1997 | Saute |
| 5,626,260 | A | 5/1997 | Waldner |
| 5,629,981 | A | 5/1997 | Nerlikar |
| 5,632,314 | A | 5/1997 | Koppe et al. |
| 5,636,637 | A | 6/1997 | Guiolet et al. |
| 5,643,341 | A | 7/1997 | Hirsch et al. |
| 5,647,411 | A | 7/1997 | Koppe et al. |
| 5,668,633 | A | 9/1997 | Cheetam et al. |
| 5,687,322 | A | 11/1997 | Deaton et al. |
| 5,690,252 | A | 11/1997 | Oleksiewicz et al. |
| 5,692,291 | A | 12/1997 | Deevi et al. |
| 5,697,527 | A | 12/1997 | Altieri, Jr. et al. |
| 5,711,458 | A | 1/1998 | Langeveld et al. |
| 5,711,601 | A | 1/1998 | Thomas et al. |
| 5,715,314 | A | 2/1998 | Payne et al. |
| 5,716,150 | A | 2/1998 | Gueret |
| 5,717,750 | A | 2/1998 | Adams, Jr. et al. |
| 5,720,017 | A | 2/1998 | Cheetam et al. |
| 5,724,424 | A | 3/1998 | Gifford |
| 5,730,330 | A | 3/1998 | Reading |
| D393,150 | S | 4/1998 | Swanston et al. |
| 5,771,524 | A | 6/1998 | Woods et al. |
| 5,778,901 | A | 7/1998 | Abrahamian |
| 5,785,510 | A | 7/1998 | Altieri, Jr. et al. |
| 5,785,960 | A | 7/1998 | Rigg et al. |
| 5,797,750 | A | 8/1998 | Gouriou et al. |
| 5,813,420 | A * | 9/1998 | Sussman .................. 132/294 |
| D401,246 | S | 11/1998 | Langeveld et al. |
| 5,841,421 | A | 11/1998 | Cheetam et al. |
| 5,842,641 | A | 12/1998 | Mazzalveri |
| 5,860,809 | A | 1/1999 | Meehan |
| 5,862,947 | A | 1/1999 | Wiegner et al. |
| 5,867,403 | A | 2/1999 | Sasnett et al. |
| 5,897,204 | A | 4/1999 | Dittmer et al. |
| 5,903,465 | A | 5/1999 | Brown |
| 5,904,421 | A | 5/1999 | Mazzalveri |
| 5,906,433 | A | 5/1999 | Mazzalveri |
| 5,924,426 | A | 7/1999 | Galazin |
| 5,931,166 | A | 8/1999 | Weber et al. |
| 5,938,080 | A | 8/1999 | Haaser et al. |
| 5,944,227 | A | 8/1999 | Schroeder et al. |
| 5,945,112 | A | 8/1999 | Flynn et al. |
| 5,960,411 | A | 9/1999 | Hartman et al. |
| 5,971,351 | A | 10/1999 | Swaab |
| 5,972,322 | A | 10/1999 | Rath et al. |
| 5,982,501 | A | 11/1999 | Benz et al. |
| 5,984,146 | A | 11/1999 | Kaufman |
| 5,993,792 | A * | 11/1999 | Rath et al. .................. 424/70.28 |
| 6,000,407 | A | 12/1999 | Galazin |
| 6,002,488 | A | 12/1999 | Berg et al. |
| 6,003,731 | A | 12/1999 | Post et al. |
| 6,021,362 | A | 2/2000 | Maggard et al. |
| 6,035,860 | A | 3/2000 | Mombourquette |
| 6,035,867 | A | 3/2000 | Barrick |
| 6,056,158 | A | 5/2000 | Rossetti et al. |
| 6,065,969 | A | 5/2000 | Rifkin et al. |
| 6,073,834 | A | 6/2000 | Michael et al. |
| 6,089,538 | A | 7/2000 | Shirkhan |
| 6,119,895 | A | 9/2000 | Fugere et al. |
| 6,121,878 | A | 9/2000 | Brady et al. |
| 6,139,429 | A | 10/2000 | Shoemaker, Jr. |
| 6,158,997 | A | 12/2000 | Post |
| 6,172,596 | B1 | 1/2001 | Cesar et al. |
| 6,177,093 | B1 | 1/2001 | Lombardi et al. |
| D437,151 | S | 2/2001 | Gerstmar |
| 6,182,555 | B1 | 2/2001 | Scheer et al. |
| 6,186,686 | B1 | 2/2001 | Neuner et al. |
| 6,198,536 | B1 | 3/2001 | Baker |
| 6,202,895 | B1 | 3/2001 | Fox |
| D442,405 | S | 5/2001 | Gerstmar |
| 6,264,786 | B1 | 7/2001 | Cromett |
| 6,267,970 | B1 * | 7/2001 | Matesevac et al. ........... 424/401 |
| 6,270,273 | B1 | 8/2001 | Ohba |
| 6,273,298 | B1 | 8/2001 | Post |
| 6,293,284 | B1 | 9/2001 | Rigg |
| 6,297,420 | B1 | 10/2001 | Heincke |
| 6,318,596 | B1 | 11/2001 | Wiesner |
| 6,338,030 | B1 | 1/2002 | Senn et al. |
| 6,338,349 | B1 | 1/2002 | Robinson et al. |

(56) References Cited

U.S. PATENT DOCUMENTS

| | | | |
|---|---|---|---|
| 6,371,129 B1 | 4/2002 | Le Bras-Brown et al. | |
| 6,382,269 B1 | 5/2002 | Tatsuno | |
| 6,383,542 B1 | 5/2002 | Khodor et al. | |
| 6,402,120 B1 | 6/2002 | Swaab | |
| 6,412,658 B1 | 7/2002 | Bartholomew et al. | |
| D461,080 S | 8/2002 | Bartholomew et al. | |
| D465,810 S | 11/2002 | Bartholomew et al. | |
| 6,510,366 B1 * | 1/2003 | Murray et al. | 700/239 |
| 6,516,245 B1 | 2/2003 | Dirksing et al. | |
| 6,557,369 B1 | 5/2003 | Phelps et al. | |
| 6,588,085 B2 | 7/2003 | Holloway | |
| 6,607,100 B2 | 8/2003 | Phelps et al. | |
| 6,615,881 B2 | 9/2003 | Bartholomew et al. | |
| 6,622,064 B2 | 9/2003 | Bartholomew et al. | |
| 6,663,818 B2 | 12/2003 | Statham et al. | |
| D485,310 S | 1/2004 | Bartholomew et al. | |
| 6,672,341 B2 | 1/2004 | Bartholomew et al. | |
| 6,728,307 B1 * | 4/2004 | Derryberry et al. | 375/219 |
| 6,779,686 B2 | 8/2004 | Bartholomew et al. | |
| 6,782,307 B2 * | 8/2004 | Wilmott et al. | 700/233 |
| D500,804 S | 1/2005 | Bartholomew et al. | |
| 6,883,561 B2 | 4/2005 | Bartholomew | |
| D513,040 S | 12/2005 | Bartholomew | |
| 7,082,970 B2 | 8/2006 | Bartholomew et al. | |
| 7,099,740 B2 | 8/2006 | Bartholomew et al. | |
| 7,121,429 B2 | 10/2006 | Bartholomew et al. | |
| 7,134,573 B2 | 11/2006 | Post | |
| 7,174,310 B2 | 2/2007 | Bartholomew et al. | |
| 7,395,134 B2 | 7/2008 | Bartholomew | |
| 7,475,710 B2 | 1/2009 | Bartholomew | |
| 7,624,769 B2 | 12/2009 | Bartholomew | |
| 2002/0010528 A1 | 1/2002 | Bartholomew et al. | |
| 2002/0109270 A1 | 8/2002 | Swaab | |
| 2002/0131985 A1 * | 9/2002 | Shana'a et al. | 424/401 |
| 2002/0136700 A1 | 9/2002 | Margosiak et al. | |
| 2003/0014324 A1 | 1/2003 | Donovan et al. | |
| 2003/0066096 A1 * | 4/2003 | Bryan | 800/8 |
| 2003/0098314 A1 | 5/2003 | Phelps et al. | |
| 2003/0151611 A1 | 8/2003 | Turpin et al. | |
| 2004/0004309 A1 | 1/2004 | Sears | |
| 2004/0122553 A1 | 6/2004 | Phan et al. | |
| 2004/0243361 A1 | 12/2004 | Steuben et al. | |
| 2006/0024342 A1 | 2/2006 | Bartholomew et al. | |
| 2006/0043111 A1 | 3/2006 | Jennings et al. | |
| 2006/0124196 A1 | 6/2006 | Bartholomew et al. | |
| 2006/0283521 A1 | 12/2006 | Bartholomew et al. | |
| 2007/0194038 A1 | 8/2007 | Bartholomew et al. | |
| 2008/0047972 A1 | 2/2008 | Bartholomew et al. | |

FOREIGN PATENT DOCUMENTS

| | | |
|---|---|---|
| DE | 4110299 C1 | 2/1993 |
| DE | 40202765.5 | 3/2002 |
| EP | 0443741 B1 | 8/1991 |
| EP | 0446512 B1 | 1/1995 |
| EP | 0682236 B1 | 11/1995 |
| EP | 0686997 A2 | 12/1995 |
| EP | 0871022 | 10/1998 |
| EP | 1093842 | 4/2001 |
| EP | 3002418 | 2/2003 |
| EP | 1429640 | 3/2007 |
| EP | 1297409 | 5/2008 |
| EP | 2000089 A1 | 12/2008 |
| FR | 021986 | 3/2002 |
| GB | 3002418 | 3/2002 |
| GB | 2431577 | 5/2007 |
| GR | 3062096 | 6/2007 |
| JP | 04-231006 | 8/1992 |
| JP | 05-025020 | 2/1993 |
| JP | 05-107115 | 4/1993 |
| JP | 05-233651 | 9/1993 |
| JP | 07-243908 | 9/1995 |
| JP | 07-270396 | 10/1995 |
| JP | 08-050125 | 2/1996 |
| JP | 08-280633 | 10/1996 |
| JP | 09-10033 | 1/1997 |
| JP | 09-038045 | 2/1997 |
| JP | 09-133584 | 5/1997 |
| JP | 09-178560 | 7/1997 |
| JP | 10-339670 | 12/1998 |
| JP | 11-169231 | 6/1999 |
| JP | 11-218447 | 8/1999 |
| JP | 11-265443 | 9/1999 |
| JP | 2001-126140 | 5/2001 |
| JP | 11-66435 | 1/2003 |
| SU | 1704759 | 1/1992 |
| WO | 95/05892 | 3/1995 |
| WO | 98/05417 | 2/1998 |
| WO | 98/30189 | 7/1998 |
| WO | 99/34905 | 7/1999 |
| WO | 00/64570 | 11/1999 |
| WO | 99/61234 | 12/1999 |
| WO | 01/12239 | 2/2001 |
| WO | 01/91601 | 6/2001 |
| WO | 01/75586 | 10/2001 |
| WO | 01/91600 | 12/2001 |
| WO | 02/05200 | 1/2002 |
| WO | 03/026458 | 4/2003 |
| WO | 2006/020189 | 2/2006 |
| WO | 2006/052863 | 5/2006 |

OTHER PUBLICATIONS

Steve Inskeep, National Public Radio hosts about VinoVenue (a wine tasting bar in San Francisco, http://www.vinovenue.net/), National Public Radio, copyright 2004.
Website at www.reflect.com.
Website at www.threecustom.com.
Website at www.colorlab-cosmetics.com.
Pamphlet of Jovan, "Express your individuality."
Website at www.immedia.it—"Coty Introduces Jovan Individuality" pp. 1-3 (accessed Jun. 8, 2001).
Website at www.cpcpkg.com.
Website at www.fast-fluid.com- "TiNTiA (hair dye dispenser" p. 2 (accessed May 18, 2004).
Information from www.cosmetics.com/custblnd.htm.
Evans, "An Introduction to Color", John Wiley & Sons, Inc, New York, 1948, pp. 87-90.
Wyszecki et al., "Color Science; Concepts and Methods, Quantitative Data and Formulae", 2nd Edition, A. Wiley Intescience Publication, p. 63.
Cheskin, L. "Color Guide for Marketing Media", The MacMillan Co., 1954, pp. 133-140.
Lovett, P.A., et al., "Measurement of the Skin Colour of Babies in Hospital," National Lighting Conference 1986, pp. 140-154.
"The Shades of You; Your Color Palette," "Your New Image Through Color & Line", California Fashion Image, Crown Summit Books, 1981, pp.
Shibatani, J., et al., "Measurements of Aging Effects of Facial Color Distribution and Applications," J. Soc. Cosmet. Chem. Japan, vol. 19 No. 1,1985, pp. 48-52.
Website at www.idexcorp.com/groups/fluidmgt.asp- "Fluid Management" pp. 1-2 (accessed May 18, 2004).
Supplementary European Search Report dated Apr. 6, 2004.
Search Report dated May 23, 2003, PCT/US02/29515.
International Search Report for PCT/US2005/025384 dated Feb. 23, 2006.
International Search PCT/US2005/040240 dated Apr. 3, 2006.
EP Office Action for Serial No. 01 922 731.3-2307, Applicant IMX Labs, Inc. dated May 17, 2004.
EP Office Action for Serial No. 02 763 648.9-2313, Applicant IMX Labs, Inc. dated Jun. 6, 2005.
Extended EP Search Report for EP2000089A1 dated Nov. 11, 2008.

* cited by examiner

POINT-OF-SALE BODY POWDER DISPENSING SYSTEM

CLAIM OF PRIORITY

This application is a continuation of application Ser. No. 10/848,273 filed on May 18, 2004 (now U.S. Pat. No. 7,121,429), which is a continuation of application Ser. No. 10/437,085 filed on May 13, 2003, now U.S. Pat. No. 6,779,686, which is a continuation of application Ser. No. 10/151,398 filed May 20, 2002 (abandoned), which is a continuation of Ser. No. 09/872,929 filed on Jun. 1, 2001 (now U.S. Pat. No. 6,412,658).

FIELD OF THE INVENTION

The present invention pertains to the field of and more particularly an interactive to cosmetic body powder selection system having a point of sale dispenser.

BACKGROUND OF THE INVENTION

The cosmetic industry offers consumer cosmetic applications in many forms, such as for the nail polishes, creams, powders, other makeup, and combinations thereof. Many of these are offered in a large but finite selection of colors, hues, shades, tints, or other effects or additives.

In the typical scenario, these products are pre-packaged according to a predetermined fixed amount of different colors or effects. The products are then ordinarily displayed to reveal a limited number of points on a discontinuous spectrum of colors or effects. Consequently, the choices of color, effects, or both will be limited by the available stock at the point of sale, and also particularly by the specific colors and effects chosen for sale in advance by the manufacturer. The consumer is hardly afforded an opportunity if any to custom blend a color selection.

This has become particularly apparent in the line of body powders commonly used by individuals for cosmetic or limited medicinal purposes. Examples of such body powders may come in many forms, such as blush, face powder, foundation, cheek powder, eye shadow or the like. The body powders may also encompass customized medicated powder, toot powder or other types of powder used for medicinal purposes or any of the precious powder with medicinal additives.

In recent years, it has also become popular to modify the ultimate visual appearance of the skin by the addition of effects over some or all of the body, such as a metallic effect, sparkles, shapes (e.g., hears, stars, etc.), texture or the like.

Frequently, these must be purchased and applied separately from an underlying base cosmetic. Once again, the consumer is faced with a finite selection and will be limited in choice by availability at the point of sale.

In view of the foregoing, a need has developed for a custom cosmetic color selection system, pursuant to which a consumer or other customer (such as an intermediate retailer or wholesaler) can interact with the supplier to select a specific color, effect or both, to blend the resulting cosmetic product at or near the time of selection (e.g. on site at a point of sale location, or remotely such as by mail order, phone order or internet purchase).

An example of one such custom cosmetic color selection system is found in copending commonly owned U.S. patent application Ser. No. 09/818,077, filed Mar. 27, 2001; Ser. No. 09/818,4389, filed Mar. 27, 2001: and PCT Application Serial No. PCT/US01/09777, filed Mar. 27, 2001, hereby incorporated by reference for all purposes.

To date, cosmetic powders typically are sold as units pre-packaged at a remote packaging facility. Increasingly, there also has been a need for dispensing of cosmetics at the point of purchase, in order to improve, for instance, inventory control, product freshness and product selection, as well as to improve customer interaction and development of product loyalty.

SUMMARY OF THE INVENTION

The present invention meets the foregoing need by providing a system, particularly one employed at a point of sale, for the custom selection, design, blending, mixing or packaging of a body powder, and more particularly a cosmetic powder color, effect or both. The present invention includes one or a combination of components that facilitate a customer-interactive process of custom cosmetic selection, dispensing or both. Though applicable to the selection and preparation of cosmetics other than cosmetic powder (such as, lip gloss, eye gel, cheek gel, creams, lotions, nail polish, perfumes or the like), the present invention is illustrated by reference to one example of a system for customizing a cosmetic powder.

Pursuant to such example, the system includes a cosmetic powder dispenser that contains a plurality of different shades, tints or hues of colors or pigments, which can be dispensed in preselected proportions to create a custom color selection, afford point of purchase dispensing, or bot. A user-interactive system is provided at a point-of-sale for allowing a user to custom choose or dispense a color, effect, or both. Information about the selection is employed for dispensing to the appropriate proportions of ingredients. Preferably the ingredients are dispensed manually into a powder canister having an integrated brush in fluid communication with the canister. In another embodiment, the system is automated.

DETAILED DESCRIPTION OF THE INVENTION

Figure 1:
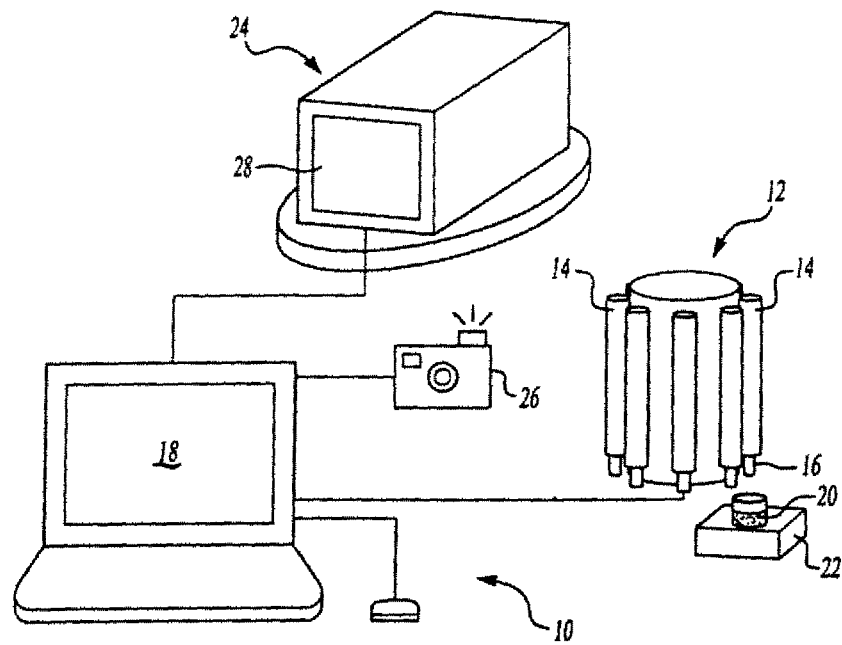
FIG. 1 is a schematic of one illustrative example of a system in accordance with the present invention.

The present invention is directed to a unique system for custom formulating or dispensing powder cosmetic compositions, and is illustrated by reference to an exemplary system for custom formulating or dispensing cosmetic, powder. Accordingly, in a preferred embodiment, as shown in FIG. 1, the system 10 includes a cosmetic powder dispenser 12 that contains a finite plurality of different shades, tints, hues of colors, pigments, or optional effects, which can be dispensed in preselected proportions to create a custom selection, and optionally a selection from a virtually infinite range of options. Effects that may be dispensed in accordance with the present system may be any suitable effect including but not limited to glitter sparkles, luminescence, phosphorescence, ingredients for pearlizing or providing a matte finish, fragrance, or medicinal or other functional additives, such as moisturizer, sunscreen, vitamins (including anti-oxidants), antibiotics, fungicides, anti-aging ingredients, exfoliator or the like. The dispenser 12 preferably has a fixed number of chambers 14 for holding each of the different shades, tints, or hues of colors or pigment or effects. The chambers 14 have an outlet with a nozzle 16 as shown. Alternatively, the chambers 14 may dispense to a common chamber to all of the chambers 14, which in turn dispenses to an external receptacle 20 for receiving a cosmetic powder with or without effects. In one preferred embodiment, the dispenser is operable manually and thus may not include any computer or other control.

As illustrated in FIG. 1, however, another embodiment contemplates that the dispenser is automated or controlled by a computer, such as computer 18 (or another suitable controller) shown in controlling communication with the dispenser. In this manner, cosmetic selection or other transaction-related information may be entered into a computer (e.g. using the keyboard or mouse shown or alternatively using a touch screen monitor, bar code scanner, or other input device) by a computer operator or user of the system, which may be the consumer, a technician, or other user.

The dispenser configuration may vary as desired. In one embodiment (not shown), the dispenser contains one or more translatable (e.g., manually or via a suitable motor, such as a stepper motor adapted for linear or rotational motion, or a combination thereof) nozzles that will dispense the different materials in the respective chambers into one or more receptacles 20 fixed in a single location. Alternatively, the receptacle may be placed on a platform or other mounting stage 22, which itself is translatable (e.g., manually or via a suitable motor, such as a stepper motor adapted for linear or rotational motion, or a combination thereof).

The platform or stage may also include a vibrator or shaker to assure uniform mixing and dispersion of the ingredients. A vibrator or shaker may be employed independent of the platform or stage. Such vibrator shaker or other mixer will typically have a motor that reciprocally drives a member for holding a receptable containing the ingredients to be mixed. Examples of such auxiliary components are disclosed, for instance, in U.S. Pat. Nos. 5,906,433 and 5,507,575, hereby incorporated by reference, and may be modified as appropriate for use in the present invention.

Any computer employed in the system of the present invention preferably has a database stored in its memory or is otherwise programmed such that the entry of a particular cosmetic selection into the computer will retrieve information about the specific proportions of shades, tints or hues necessary for dispensing to achieve the ultimate desired result (e.g., the specific recipe associated with the result). The computer may also be equipped with a suitable mathematical integration feature such that, where a result selected finds no exact formula or recipe match, the computer will calculate the formula or recipe by reference to data associated with nearby colors. To illustrate, by reference to the example provided in the Background section, suppose that a user desires a shade of 26.74, but the data base of the computer only offers data to the shade of 26.7 or 26.8, the computer will calculate the relative changes to the formula that will be necessary to achieve a value of 26.74.

The computer 18 is capable of outputting the data associated with the users choice to a suitable controller associated with either the cosmetic powder dispenser, the computer itself, or both, which will then dispense the appropriate predetermined proportion of the recipe or formula ingredients into the receptacle 20. The computer 18 will have like capabilities for dispensing preselected effects, including but not limited to glitter, sparkles, luminescence, phosphorescence, fragrance, or medicinal additives, such as moisturizer, sunscreen, vitamins (including anti-oxidants), antibiotics, fungicides, anti-aging ingredients, exfoliator or the like (which may be dispensed from a dispenser associated with the cosmetic powder dispenser or a separate dispenser). Of course, implicit in the above, the computer 18 might be employed for providing the recipe or formula for a user to manually operate the dispensing device. Further, it will be appreciated that each individual formulation that is dispensed may include ingredients from a single chamber only, or from a plurality of chambers. Thus, the present invention contemplates within its scope that the system is employed for filling the receptacle 20 entirely with contents of a single chamber, or with a mixture of contents from plural chambers.

The skilled artisan will appreciate that the present invention is intended to be employed in the dispensing of wet or dry powdered materials. Typically, the materials will be finely particulated as is common in the cosmetic industry. Thus it is anticipated that any of a number of different types of ingredients might be employed, including but not limited to powders such as powder crushed mineral products (e.g., mica, days such as white clay, bentonite clay or kaolin clay, talc, silica, calcium carbonated, powdered natural product such as rice powder, corn starch, wheat flour, oat flour, wheat bran, oat bran, barley, aloe vera, silk, ginger, arrowroot, dry flour tapioca, calendula, birch bark extract or the like. Synthetic powders may also be employed. Of course, combinations of the above may be employed as desired. Suitable pigments or colorants may also be employed and may be mineral based, naturally occurring or synthetic. They may be provided separately from the powder or mixed into the powder within the chambers 14. Examples of pigments or colorants that might be offered in a system according to the present invention include, for instance, those for achieving a like result as titanium dioxide, manganese violet, ultramarines, carmine, iron oxides, red 7 lake, yellow 6 lake, yellow 10 lake or mixtures thereof. Thus, the spectrum of colors typically will include a range from whites, to yellows, blues, green and reds. Metallic shades and earth tones are also possible such as tans, browns, silvers, golds, bronzes, grays and the like.

An example, without limitation, of a preferred composition for a powder formulation optionally includes one or more preservatives and a powder. For example, the formulation may include a preservative selected from the group consisting of diazolidinyl urea, imidazolidinyl urea, methylparaben, propylparaben, grapefruit seed extract, potassium sorbate, tocopherol (Vitamin E), Vitamin A (retinyl), Vitamin C, sorbic acid, benzoic acid or mixtures thereof. More preferably, it is selected from the group consisting of methylparaben, imidazolidinyl urea, potassium sorbate and mixtures thereof.

The above ingredients may be admixed in their dry state from individual particulated starting materials. In another embodiment they are slurry mixed and then dried. Optionally they are provided as granulated and ground to a predetermined particle size before during or after mixing. Conventional atomization techniques for forming powders are also possible.

Though larger or smaller particle sizes are possible, typically, the powders of the present invention will exhibit a mesh size number of at least 40 and more preferably at least 80 and still more preferably about 80 to about 200. In some applications (e.g., where a sprayer is employed) a particle size on the order of about 50 microns may also be employed.

In one preferred embodiment, the system of FIG. 1 employs at least four groups of chambers 14. A first group of chambers has loose powders for example, those having ingredients that include talc, imidazolidinyl urea, potassium sorbate, methylparaben, and optionally mica, silica or panthenol. The first group of chambers includes pigments or other colorants individually or combined to include titanium dioxide, manganese violet, ultramarines, carmine, iron oxides, or the likes. A second group of chambers has dusting powders. These might include talc, mica, titanium dioxide or the like, silica, imidazolidinyl urea, potassium sorbate, methylparaben, a pigment such as red 7 lake, or the likes. A third group of chambers might include a translucent or iridescent "shimmer" powder, with ingredients such as talc, mica, titanium dioxide, silica, imidazolidinyl urea, potassium sorbate, methylparaben, yellow 6 take, yellow 10 lake, iron oxides or the likes.

In another embodiment, as shown in FIG. 1, the system may include a personal viewing station 24 that simulates or provides virtual feedback to a user about how a particular color or effect selection will look on that particular user. For instance, the system might include a camera 26 or other visual information input or gathering device (e.g., a video recorder), preferably a digital device, which captures an image of the user and transports information about that image to a computer or directly to a video monitor 28 or viewing screen for display. A computer (which preferably but need not be the computer for color selection) is connected to the monitor or screen.

In a particularly preferred embodiment, the computer has software that can locate various regions of the user's body (such as by scanning a region for a pattern of color or tone changes commonly associated with an individual's skin complexion).

The computer may then deliver information to the specific color choices selected by the user. Thus, a user can view his or her skin complexion on the screen with a powder color or effect choice superimposed on it. In one embodiment the superimposed image is generated while the user's body part is in the viewer of the visual information input device, and the user obtains real time information about color choice (e.g. a face could be placed in the view of a camera and simultaneously the complexion regions are detected and virtually applied to the image of a face on the monitor, whereby the user can move the face and the images on the monitor will simultaneously respond to such movement). In another embodiment, the user will have an image taken of the body part and the image will be fixed and stored in memory so that the user need may have free use of that body part while experimenting with different color choices.

Of course, the user need not confine use of the viewing station to that of images of the user's body part. The computer may be programmed to store images of body parts of other persons (e.g. professional models), or body parts other than a face (e.g., neck, shoulder, chest, arms, legs, feet, hands or other body parts). Moreover, the computer may include photo modification or morphing features so that users can experiment with different creative ideas, or with images of hairstyles, head coverings, eyeglasses, body piercings, jewelry, or the like which can be superimposed onto the body part displayed. Of course the computer is also suitably programmed with basic functions such as menus of color schemes, effects, as well as color charts, color chips or the like. Optionally, the computer will provide instructions or recommendations for amounts or location of cosmetic application.

In one embodiment, a user can match a color with a preexisting desired color. For instance, one preferred approach to color matching is to employ a spectrophotometer, and particularly, a portable one such as that commercially available from GretagMacbeth (e.g., SPECTROLINO™), X-Rite, Inc., Datacolor (e.g., MICROFLASH®SPECTROPHOTOMETERS). Without limitation, other examples of spectrophotometers include those described in U.S. Pat. No. 6,002,488 (Berg et al.) and U.S. Pat. No. 6,198,536 (Baker), both hereby incorporated by reference. Other suitable color matching techniques are possible as well, such as those addressed in U.S. Pat. No. 5,668,633 (Cheetam et al.); U.S. Pat. No. 5,720,017 (Cheetam et al.); and U.S. Pat. No. 5,841,421 (Cheetam et al.), all hereby incorporated by reference. Any such spectrophotometer can be integrated into an overall apparatus or portably removable.

Figure 2:
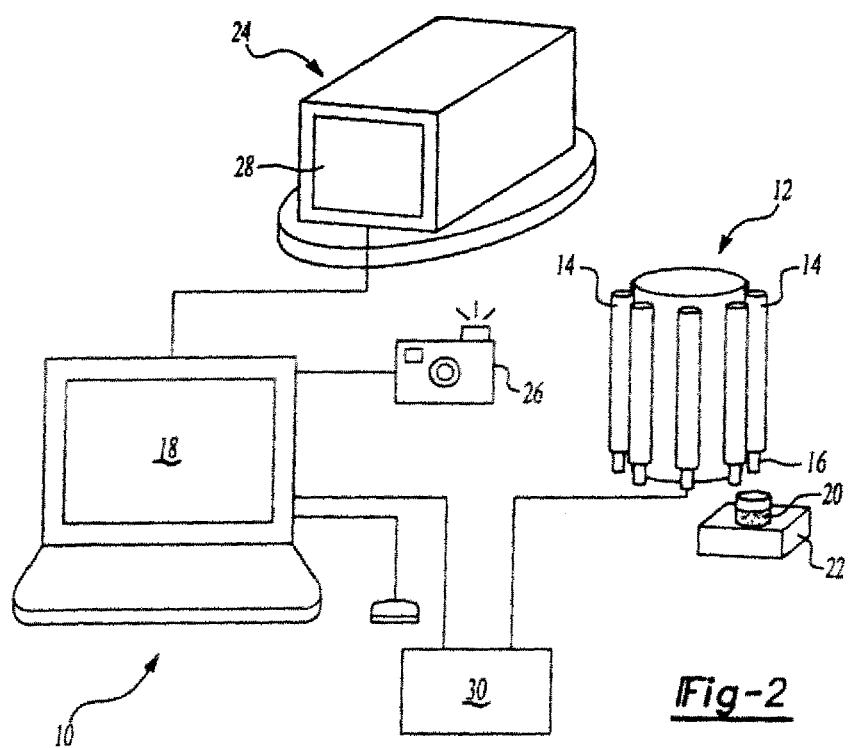
FIG. 2 is a schematic of another illustrative example of a system in accordance with the present invention.

In another aspect of the present invention, such as shown by FIG. 2 (which includes like reference numerals to correspond to like parts as in FIG. 1), the color selection is done using a remote communication system 30, such as by mail order, phone order or preferably via the internet. Thus, the point of purchase will be remote from the point of dispensing. In this embodiment, for example an internet web site is maintained which permits a user such as a remote user to select cosmetic color or effect, view the colors chosen either on a pallet or virtual mannequin, for instance, place orders for the specific color and/or effect chosen, and pay for such order. The user could also transmit an image of the user's body part to the web site, which then permits a personal virtual viewing, such as described previously. The web site includes a page that offers the user a choice of custom blending a cosmetic or ordering from stock, with appropriate rinks to such respective pages. The page includes a link to an order or checkout page, which optionally may be associated with all other pages. Preferably a user that elects to link to a color selection page is then offered choices of linking to particular different cosmetic types.

Of course, the skilled artisan will appreciate that direct or indirect finks between all pages of the web site may be made available to the user (with or without appropriate security measures; moreover, all or only some of the pages may be linked to the home page or to any other preselected page, such as a site map page), One page offers the user at least one spectrum (either continuous or not) of color or choices. The user is able to navigate a cursor to any location in the spectrum to choose a color that the user desires to view (this feature may also be employed with on site, point of sale computers, either with or without tangible pallets or color or effects chips).

Upon selecting a color, the user advances to a page or another location on the same page to view the color or effect independent of other colors or effects, or optionally in side by side or like adjacent comparison relative to other colors or effects. Once the user selects a color or effect, the user is provided the option of further shopping or immediate check out. Upon checking out the information (e.g., formula) about the user's color and effect choice is communicated to a dispenser of the type discussed previously, where the information is fed to a controller and the user's choice is dispensed, packaged and provided to the user (e.g., by shipping to the user).

The web site (as with the other system where sales may not occur remotely from dispensing) will allow users to store profiles about themselves. For instance, a user will be able to store favorite color or effect choices, historical information about the user, and other biographical information about the user. Optionally, the website is adapted to permit the user to set up an account with ship-to, bill-to, credit card, or preferred shipping method information, which is retrievable, such via a password entry in later visits, and used for expedited checkout, as is common in conventional one-click internet shopping routines. The web site may also feature an advisory page, where specific information about the person is provided, and based thereon, a computer program will provide the user with recommended selections. The web site will feature suitable security precautions to allow users to trust the confidential of the transaction and credit card information. The web site may also afford business to business accommodations, so that packagers, retailers, wholesalers or other intermediate vendors can custom order individual or lots of products for delivery to a desired location. The skilled artist should acquainted with various existing techniques for retail networking architecture and operation, which permit the placement and processing of a purchase order, examples of which are disclosed without limitation in U.S. Pat. No. 5,960,411 (Hartman et al, "one click" shopping); U.S. Pat. No. 5,715,314 (Payne et al.; sales and payment transactions); U.S. Pat. No. 5,724,424 (sales and payment transactions); all of the teachings of which are hereby expressly incorporated by reference for all purposes.

In one embodiment, payment is made through a debit system. For instance, purchasers can buy prepaid debit or "smart cards" cards in a desired amount, either at a retail outlet or remote (e.g., over the internet), or in the like manner, they can pay in a certain amount into an account and draw on that amount. Cash and credit card transactions are also contemplated.

Whether obtained through the web site or elsewhere, in one embodiment it is contemplated that information about purchaser preferences can be compiled in a database, e.g., for real time analysis. Thereafter, the data is queried or otherwise analyzed for evaluating demographic correlations, as well as consumer color preference data. In this manner, for instance, the information would provide valuable assistance to retailers and manufacturers (particularly those who do not employ point of sale color selection), who would rely upon such information to make decisions concerning the quantities of inventory of a color or effect to stock or manufacture. To illustrate, without limitation, data polled from the point of sale system of the present invention in the southwest states of the United States might indicate that the three most popular shades of color in that region are 26.17, 27.28 and 27.48, with 78% of consumer sales having preferred those colors. Faced with a limited number of shades that the typical conventional manufacturer or vendor has imposed for its inventory, the most popular can be selected using the above data so that the likelihood of excess inventory is reduced. In this regard, data collected may also be employed in determining recipients of product sample distribution, delivery of coupons and the like, such as disclosed in U.S. Pat. No. 6,021,362 (Maggard et al.), U.S. Pat. No. 5,612,868 (Off et al.), and U.S. Pat. No. 5,687,322 (Deaton et al.) hereby incorporated by reference.

In another aspect of the present invention, an improved met of selling cosmetics and specifically cosmetic powder is provided. The method preferably is practiced at the point of sale to a customer, and more preferably a retail customer. The method includes the basic steps of offering a customer or other user choices of colors and effects, which optionally exceed in amount the number of choices available from conventional over the counter cosmetic sales displays; optionally, permitting the user to view an image of themselves or another with the cosmetic powder virtually affixed to the body part of such person; providing a formula or recipe to a cosmetic powder dispensing device associated with the specific color or effect chosen by the user; and dispensing the specific color or effect chosen. The methods may also include additional steps as disclosed elsewhere in this discussion.

In one particularly preferred embodiment, the method further includes using the same dispensing apparatus but repeating the above basic steps for a different selection. Thus, a first user selects a first cosmetic powder ingredient formulation for dispensing, and thereafter a second user selects a second cosmetic powder ingredient formulation for dispensing. The dispensing apparatus may be configured to dispense the first formulation selection while the second selection is made, prior thereto, or subsequently thereafter, so that the same apparatus is used consecutively for different formulations.

Figure 3:
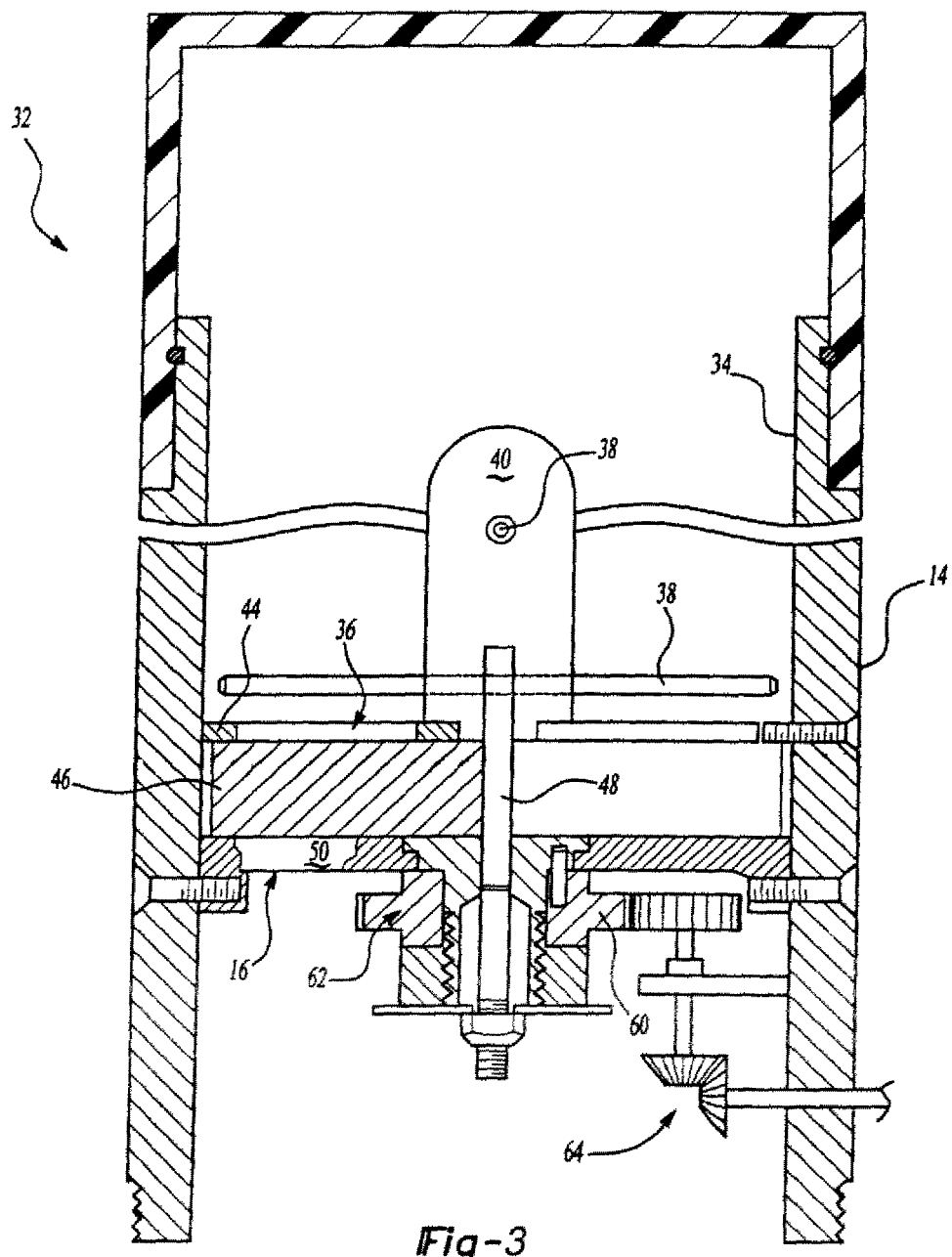
FIG. 3 is a sectional view of a preferred dispensing assembly of the present invention.
Figure 4:
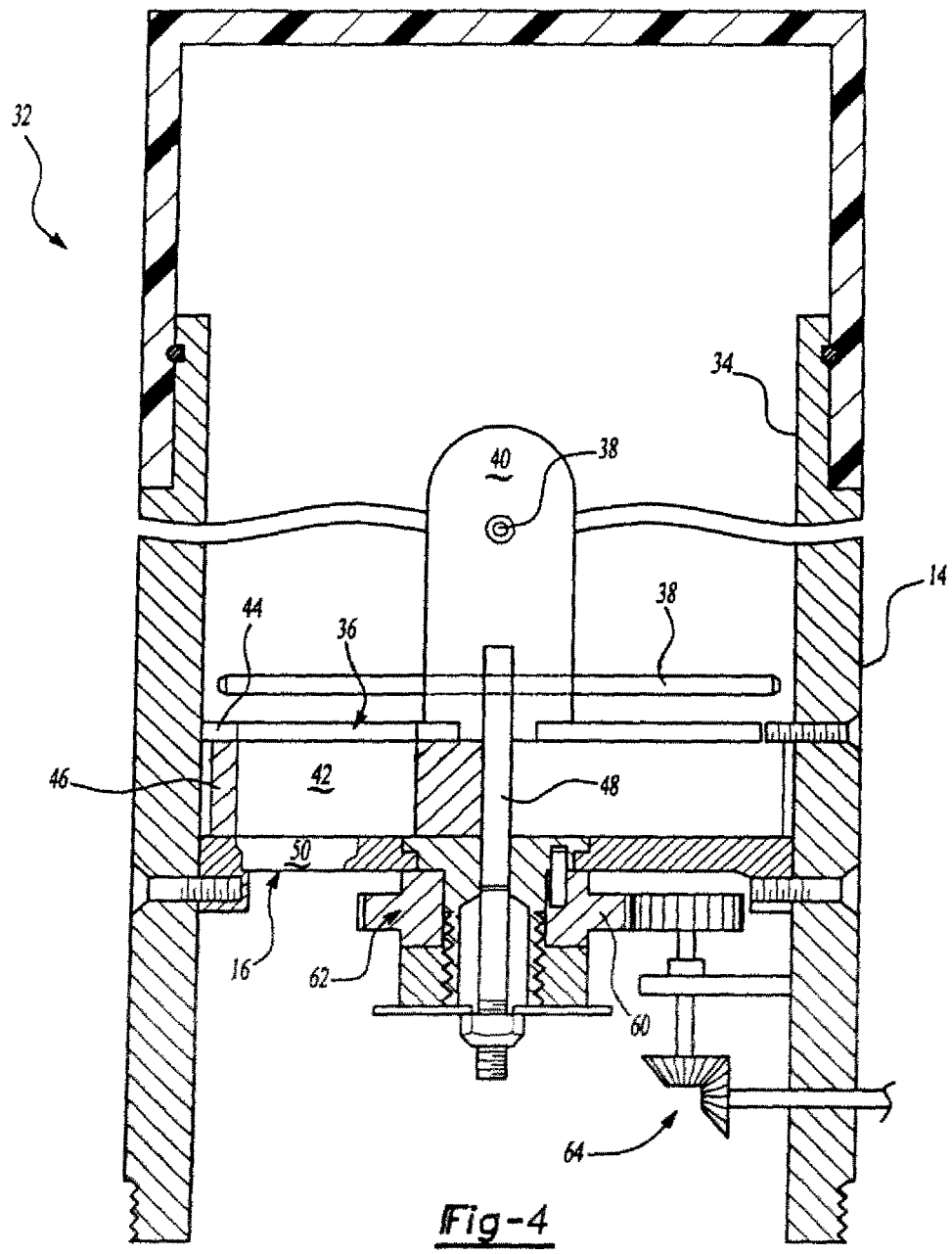
FIG. 4 is a sectional view of a preferred dispensing assembly.

Referring by way of example to FIGS. 3 and 4, a single illustrative chamber 14 of a dispenser 12 is depicted. The chamber includes a cosmetic powder dispensing assembly 32 that is configured generally with a powder holder 34, a metering device 36 (optionally having an associated mixing arm for reducing clumping) and a nozzle 16. As illustrated in FIGS. 1 and 2, a plurality of dispensing assemblies 32 may be mounted to the exterior perimeter of dispenser 12 with each dispensing assembly 32 dispensing to its own nozzle 16. Alternatively, a plurality of dispensing assemblies 32 may dispense through a common nozzle 16 which may or may not have an additional metering or mixing devise.

The powder chambers are each equipped with their own individual chamber dispenser, or they may be assembled to a common shared chamber dispenser. A preferred chamber dispensing assembly 32 includes the powder holder 34 in upstream relation to the nozzle 16. A suitable metering device 36 is employed between the powder holder and the nozzle. The metering device 36 may be manually operated or automated, it may afford metering in fixed incremental amounts. Alternatively it affords metering in continuously variable amounts for affording a more unlimited range of mixtures to be obtained. Optionally, one or more suitable mixing arm 38 may be employed as part of the metering device 36 or separate from it such as shown axially displaced along a mixing cap 40. The mixing arm may be positioned at, upstream or downstream of the metering device 36.

FIGS. 3 and 4 illustrates an example of one such assembly, in which tea metering device 36 is configured with a first aperture 42. The first aperture 42 may remain exposed or it may be covered or sealed as desired. It is foreseeable that a plate 44 may be utilized to cover or seal first aperture 42 and may be rigidly or rotatably mounted to dispensing assembly 32. Though it may be separate, the mixing arm 38 is shown as integrated with mixing cap 40 and includes a plurality of arms (e.g., radial arms). The metering device in turn has one or more apertures 42 defined in a first metering member 46. The metering device 36 is rotatably attached to an axial spindle 48. In a first closed position, as seen in FIG. 3, a nozzle chamber 50 is defined, which is sealed relative to the powder holder 34 for preventing powder from entering the chamber 50. In a second open position (FIG. 4) the aperture 42 is in registered alignment with the nozzle and powder is afforded a through passage to exit the chamber 14 through the nozzle 16.

Figure 5A:
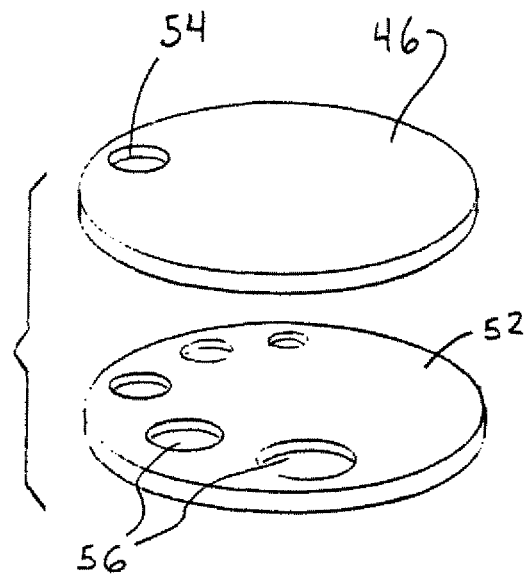
FIGS. 5A and 5B illustrate alternate metering devices of the present invention.
Figure 5B:
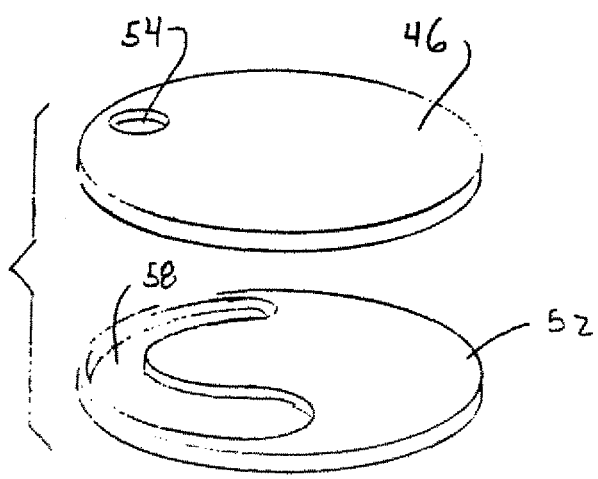

The relative amounts of powder dispensed may be adjusted in a number of different ways. For instance, the open position can be maintained in that position for a set period of time and then closed. Mixing may also occur during this operation. If the nozzle is sealed, the metering device might be raised or lowered in the chamber 14 to vary the volume of the nozzle chamber. Upon attaining the desired volume, the metering device can be closed and the nozzle cover opens to release the powder. Additionally, as shown in FIGS. 5A and 5B, it might be desirable to employ a second axially rotatable metering member 52 in opposing relation to the first (though independently rotatable) having one or more apertures configured like with the apertures of the metering device between the metering device 36 and the nozzle 16. It could serve as a cover for sealing or as a fine tuner for further controlling volume.

FIGS. 5A and 5B illustrate combinations of different second metering members 52 and first metering member 46 of metering device 36, it being recognized that aperture size, shape or other functional components of each can be replicated for the other or interchanged with the other. In FIG. 5A, for instance, the first metering member 46 and the second member 52 are each rotatable disks (though they may be translated in other direction as well). In one disks there is at least one aperture 54. In a second disk, there are plural apertures 56 of different incremental sizes. In the embodiment of FIG. 58, at least one disk has a continuously and gradually opening aperture 58. It will be appreciated that a suitably second coaxial rotatable structure typically will be needed when desired to operate the metering device 36 independent of the second member. Suitable filters, seals or the like may be employed as desired in the above configuration.

Referring again to FIG. 4, the metering device 36 is rotatably driven (e.g., via suitable gearing), which is manually actuated or automated. For instance, a suitable actuating arm (such as axial spindle 48) may be gripped and translated to transmit torque to a threaded torque transmitter 60 (which optionally is ratcheted), which resides within a seat 62. In such a configuration it is possible to transfer a torque to the threaded torque transmitter 60 through a suitable gear assembly 64 or there like.

Figure 6:
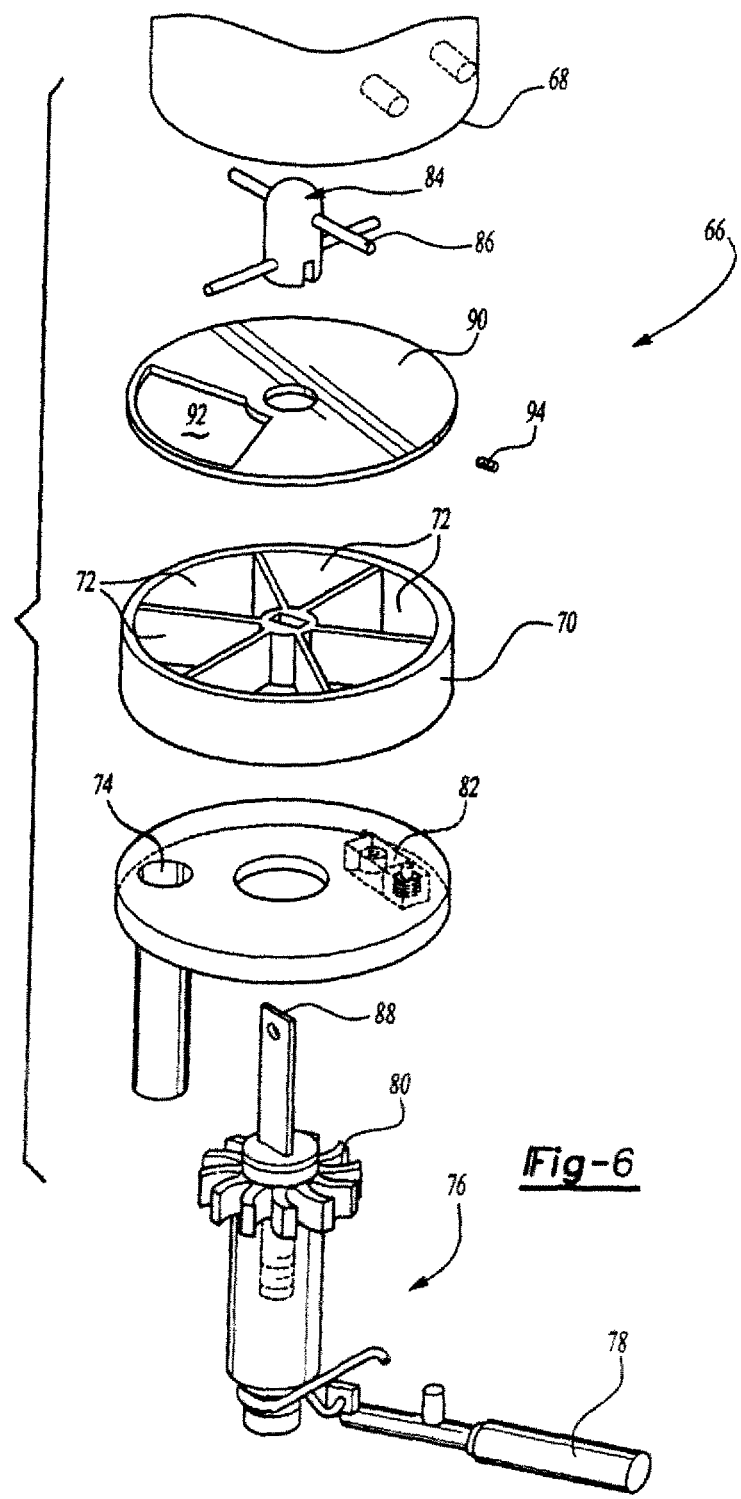
FIG. 6 is an exploded perspective of an alternative preferred powder dispenser.
Figure 7:
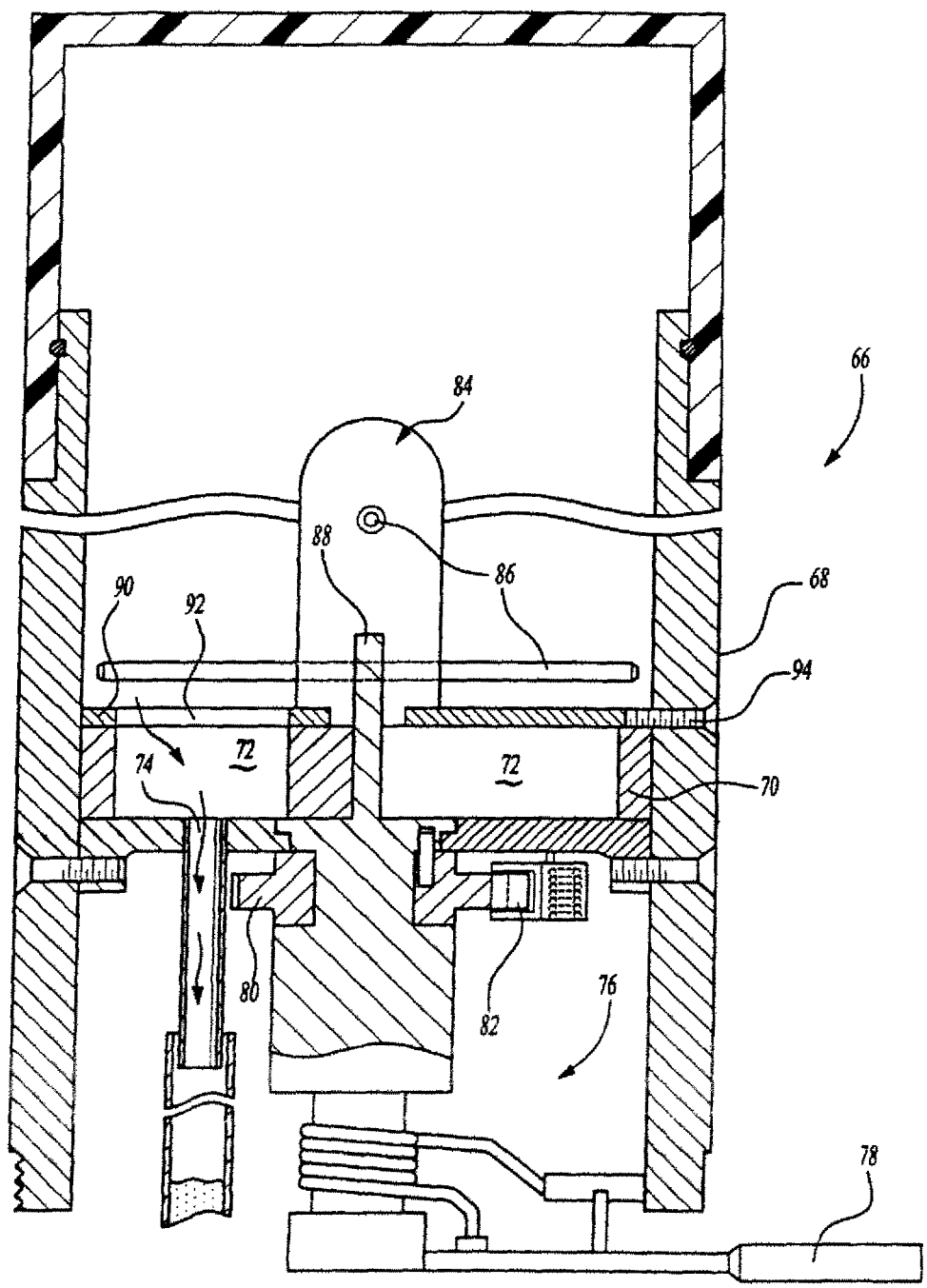
FIG. 7 is a cross sectional view of the alternative preferred powder dispenser illustrated in FIG. 6.

Referring to FIGS. 6 and 7, another alternative preferred powder dispenser 66 is configured with a powder holder 68, a metering device 70 having a plurality of chambers 72, a nozzle 74 and a drive mechanism 76. The actuation of the powder dispenser 66 is performed by advancing a ratcheted handle 78 such that rotation of the handle 78 (which may be spring biased to a return position) will result in an indexed axial rotation of the drive mechanism 76 though a predetermined angle. The axial rotation is indexable by engagement of teeth 80 of the drive mechanism 76 with a detent 82 (e.g., a spring biased detent for positive engagement). As handle 78 is rotated, the drive mechanism 76 transfers a torque to metering devise 70 and a mixing arm assembly 84 (e.g., as shown with multiple spaced arms). The drive mechanism 76 is either an integrated unitary structure or an assembly of separable (e.g. threadably attachable) parts. The mixing arm assembly 84 has at least one mixing arm 86. The mixing arm 86 may be removable from the assembly 84 and may serve to connect the drive mechanism 76 through an aperture 88.

A plate 90 is configured with an opening 92, which preferably is aligned with at least one chamber 72, allowing powder to fill any cavity residing below during each ratchet action of handle 78. The plate remains fixed in a housing (not shown), such as by a suitable attachment 94 (e.g. a set screw). When handle 78 is ratcheted again, metering devise 70 rotates causing the filled chamber 72 to substantially rotate away from opening 92 and over nozzle 74. Preferably, the weight of the powder ingredients under gravity (optionally assisted with a suitable positive or negative pressure applicator) will cause them to be transferred to the nozzle 74. Other suitable dispensing configurations are possible as well, and the above are not intended as limiting.

Figure 8A:
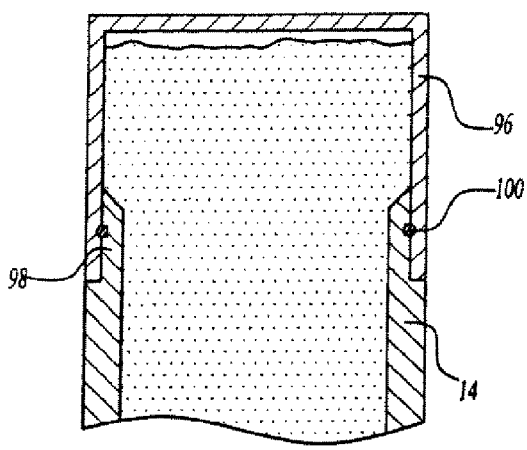
FIGS. 8A-8C illustrate chamber lids of the present invention.
Figure 8B:
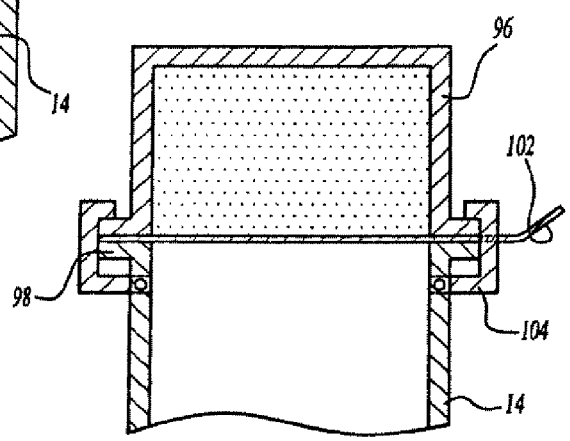
Figure 8C:
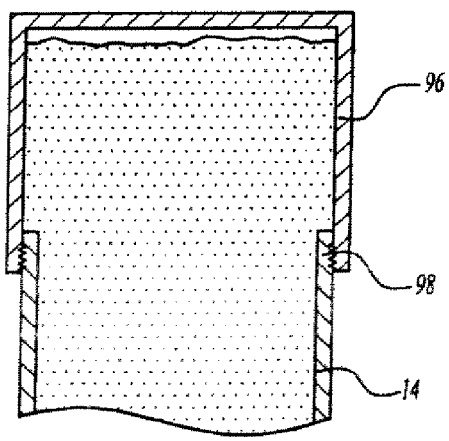

Referring to FIGS. 8A-8C there are illustrated examples of alternative configurations for a lid 96 of the chamber 14. The lid 96 preferably is openable or removable, to afford access to the inside of each chamber 14. FIG. 8A illustrates a lid 96 that overlaps with a rim 98 of the chamber 14. A suitable seal 100 is placed between the rim and lid. FIG. 8B illustrates another embodiment where the lid 96 is provided as refill container or cartridge for the powder. It is brought in contact with the rim 98 and a removable tabbed cover 102 (which may also be a rupturable cover) is removed. In this example, there also illustrates the use of a pivotal arm sealing clamp 104 for securing the lid to the rim. FIG. 8C illustrates a lid 96 and rim 98 each being threaded for attachment to the other. For all of the above, the lid 96 may function as a refill container or cartridge. Other lid configurations are also possible, including but not limited to plugs, crimped caps, adhesive joints, fastened joints, snap fit joints, or the like.

It will be appreciated that associated along the length of each chamber optionally may be a suitable configuration, such as a fixed or translatable support shelf, louvers, gates or the like for helping to support the weight of the powder ingredients upon itself, to avoid undue packing or clumping. Further, a suitable dehumidifier, desiccant or other like means may be employed for maintaining dry conditions within a chamber, or elsewhere in the dispensing system. The system or its components may also have a suitable vacuum attachment for help to transport powders within the system, or to assist in clean-up.

Referring again to FIG. 1, the system of the present invention also contemplates the dispensing of powders into a suitable receptacle 20. The container may be a bottle, a canister, a jar, a vial, a carton, a tray, a case, or the like. The container optionally may have associated therewith a suitable applicator, such as a swab, a brush, a sponge, a pad, a stick, a roller, or the like. In one particularly preferred embodiment the system contemplates dispensing powder into a container having integrated storage and applicator portions. By way of example, for instance, such commercially available applicator instruments are available under the designations "The Pump Brush" from MAKEUP ARTISTS CHOICE (Hampstead, Md.), "Powder Puff" from Colorescience, Division Body Chemistry Mfg., Inc (Houston, Tex.); or "Minerale Makeup Kit" from IntegraDerm (Ft. Myers, Fla.).

Figure 9:
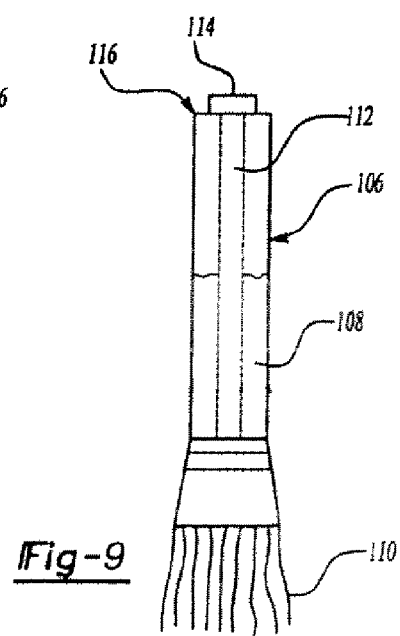
FIG. 9 illustrates a cosmetic applicator used in conjunction with the present invention.

Referring to FIG. 9, preferably one such container 10 includes a storage portion 108 for holding cosmetic (e.g., powder) and an applicator portion 110 for applying to a user's body part. The applicator portion and storage portion (which may be transparent, opaque or a combination) are in fluid communication with each other for delivering cosmetic from the storage portion 108 to the applicator portion 110. Optionally a pump 112 (e.g., depressible by a spring biased button 114 at an end 116) or other device is included to assist transport of the cosmetic from the storage portion 108 to the applicator portion 110 (either by providing a puff of air, by moving a plunger or the like). The applicator portion 110 preferably is a brush (e.g., with natural bristles, synthetic bristles, or a mixture thereof. Alternatively, a suitable open cell foam, woven or unwoven fabric or textile, or the like may be used. The applicator portion may also be a roll-on applicator (e.g., a ball and socket type configuration as is common for dispensing deodorants and anti-perspirants). It may also include a sprayer (e.g., an aerosol sprayer, pump sprayer or the like). Optionally the storage portion may be subdivided into different chambers for carrying plural powders, which can be brought into and out of fluid communication with the applicator. Suitable filters, sieves, mixing arms or other features may optionally be employed also. In a preferred embodiment, the storage portion is transparent over at least a portion of its length.

For all of the above embodiments, the ingredients that are dispensing into the system may be supplied in any suitable manner. For instance, the different ingredients can be supplied in separate containers, such as tanks, canisters, ampules, cartridges, or the like. In one embodiment, the containers are supplied as individual units. For example, a container containing a single color or effect ingredient is packaged by itself and connected to the supply system individually. In another embodiment, the containers are supplied in a kit. For example, an assembly of containers, each containing a different color or effect ingredient is packaged together and connected to the supply system as a unit. In this regard, it is possible that ingredients are packaged in a container having an opening at a remote location and a removable cap or lid is applied over the opening at such location, and then removed at the point of dispensing. Alternatively, the opening of the container might be seated with a removable or rupturable membrane. In this manner a supply line can be quickly connected to the container such as by puncturing the membrane.

Thus, it is seen how the apparatus of the present invention can be kept stocked with desired inventory levels. As discussed previously, in connection with the inventory control aspect of the present invention, as each respective container is installed into the powder delivery system of the present invention, the computer associated with the operation of the present invention may be suitably programmed to detect the installation and recalculate inventory amounts. Operators can be advised of a reduction in inventory. In one aspect, the computer is specifically programmed to notify the operator to order additional inventory. In another embodiment, the computer is specifically programmed to notify a remote subscriber of the system (e.g., over the internet), of the reduction in inventory, obviating the need for the on-site operator to monitor inventory amounts.

As will be appreciated from the above discussion, the heretofore unexpected elegant advantages of the present invention renders it suitable for application in a number of different environments including but not limited to point of sale dispensing at nail or hair salons, spas, health clubs, country clubs, hotels, shopping malls, strip centers, airport concourses, grocery stores, convenience stores, automated teller machines (in one aspect of the present invention, the user may even debit an account in order to pay for the product purchased), waiting rooms of automotive service shops or other service companies, photo studios, night clubs, restaurants, coffee house, stadiums, flea markets, parks, street vending booths, gas stations, and department stores ranging for mass-market stores to exclusive retail shops.

In one preferred embodiment, for use at a site where the point of sale is the same as the point of dispensing, the system of the present invention is separated into two or more modular components (such as for use in a store or other more permanent site dedicated to the sale of these products), and in another it is integrated into a single pod or kiosk (such for temporary sites, or use or operation within preexisting businesses like a beauty salon, the corridor of a shopping malt, or within any of the businesses identified in the immediate previous paragraph). One illustrating example is set forth in copending commonly owned U.S. patent application Ser. No. 09/818,077, filed Mar. 27, 2001; Ser. No. 09/818,389, filed Mar. 27, 2001; and PCT Application Serial No. PCT/US01009777, filed Mar. 27, 2001, hereby incorporated by reference for all purposes. Such system could be adapted as desired for housing the system of the present invention, either in combination with a nail polish dispensing system or by itself.

The pod also optionally includes a cash register, packaging station, a display station, an application station (which may be adapted for housing an on-site makeup artist), or a combination of the above. One integrated system also incorporates some or all of the modular components recited above and may also afford counter space, seating, mirrors or other consumer convenience features. The integrated systems may be assembled or prefabricated as individual units with suitable wiring for power supply or supply of other utilities such as telephone, cable, internet, satellite communication or the like.

Products offered for sale using the present system may be sold in combination with other products (e.g., brushes, refillable brushes, sponges, powder puff, cotton balls, swabs, images, effects or the like), cosmetics, nail polish and vanity accessories such as hair equipment or devices, jewelry, temporary or permanent tattoos, decals, stickers, fragrances, shoes, or other articles of clothing (some or all of which may also be customized in color or effect to match or complement the choice of cosmetic powders color or effect).

It is also possible that the system of the present invention is employed in combination with other custom cosmetic systems, such as that disclosed in U.S. Pat. No. 5,945,112 (Flynn et al.) hereby incorporated by reference, which addresses a skin foundation customizer using a spectrophotometer to measure skin color and using such data to custom formulate a foundation.

Additionally, the system of the present invention can be modified for other applications that require custom formulation powder or fluid dispensing. Thus, the present invention is contemplated to include custom dental material formulations, custom health and beauty aid products, custom fragrances, custom pharmaceutical compounds, custom lubricants, custom foods (e.g., spices, flavors, or the like), custom beverages and other formulations that are to be used or packaged at the point-of-dispensing locations.

Although the invention has been described with particular reference to certain preferred embodiments thereof, variations and modifications can be effected within the spirit and scope of the following claims.

What is claimed is:

1. A custom powder dispensing method for use at a retail purchase site, comprising the steps of:
   a) providing a computer controlled automated powder dispensing apparatus including a plurality of containers storing different powder ingredients, wherein:
      1) at least one powder ingredient is a powdered natural product;
      2) at least one powder ingredient is a vitamin; and
      3) at least one powder ingredient is a naturally occurring pigment;
   b) inputting a custom powder formulation selection into the apparatus;
   c) retrieving ingredients proportion information associated with the selection from a database of the computer of the apparatus;
   d) outputting the ingredients proportion information associated with the selection so that a controller will dispense the appropriate predetermined proportion of the ingredients onto a receptacle;
   e) rotating the powder dispensing apparatus so that one of a plurality of dispensing assemblies is aligned with the receptacle;
   f) dispensing powder ingredients into the receptacle from the one of the plurality of dispensing assemblies, in a preselected amount according to the ingredients proportion information from the outputting step, at the retail purchase site, wherein at least one of the dispensed ingredients is the vitamin;

g) placing a receptacle onto a mounting stage that is translatable;

h) mixing the dispensed powder ingredients;

i) repeating at least steps (b)-(h) for a different selection at the retail purchase site;

j) packaging the dispensed mixed powder ingredients;

k) monitoring inventory of ingredients using the computer;

l) notifying an operator of a reduction in the inventory via an internet system so that an operator is not needed to monitor inventory.

2. The method of claim 1, wherein the dispensing step is performed using a metering device capable of metering in continuously variable amounts, and wherein the metering device has a mixing arm for reducing clumping.

3. The method of claim 2, further comprising a step of slurry mixing and then drying the ingredients.

4. The method of claim 3, wherein the dispensing system includes a dehumidifier or desiccant so that dry conditions are maintained within the dispensing apparatus, and wherein payment is made through a debit system, over ever the internet, gar credit card.

5. The method of claim 4, wherein the method further comprises the step of: providing the packaged dispensed mixed powder ingredients to a user by shipping to the user.

6. The method of claim 4, wherein the vitamin dispensed is Vitamin C, and wherein the method further comprises the steps of:
(i) locating a user's face and various regions of the user's body by the computer's software by scanning a region for a pattern of color or tone changes associated with the user's skin complexion;
(ii) responding to the user's movement by providing a real time image of the user's face and the various regions of the user's body on a viewing screen,
(iii) storing the image of the user's face and the various regions of the user's body in the computer's memory so that the user may have free use of the face and the various regions of the user's body part while experimenting with different color choices;
(iv) delivering information to the specific color choices selected by the user by the computer.

7. The method of claim 4, further comprising the step of calculating the ingredients proportion information associated with the selection for the custom powder formulation selection where no exact ingredients proportion information are found.

8. The method of claim 1, further comprising the step of calculating the ingredients proportion information associated with the selection for the custom powder formulation selection where no exact ingredients proportion information are found.

9. The method of claim 8, wherein the dispensing system is capable of dispensing a first formulation selection while a second formulation selection is being made.

10. The method of claim 1, further comprising the step of detecting the installation of the plurality of containers storing different powder ingredients and recalculating inventory amounts.

11. The method of claim 10, wherein at east one of the powder ingredients includes a wet powder.

12. The method of claim 11, further comprising a step of slurry mixing and then drying the ingredients.

13. The method of claim 12, wherein the at least one powdered natural product is dispensed during dispensing step, and the at least one powdered natural product is selected from rice powder, wheat flour, oat flour, wheat bran, oat bran, barley, silk, ginger, arrowroot, dry flour tapioca, or birch bark extract.

14. The method of claim 13, wherein the dispensing step is performed using a metering device capable of metering in continuously variable amounts, and wherein the metering device has a mixing arm for reducing clumping.

15. The method of claim 14, wherein the dispensing system further includes a camera and a viewing screen connected to the computer that is capable of simulating or providing virtual feedback to a user about how a particular color or effect selection will look on that particular user.

16. The method of claim 1, further comprising the step of transporting powders within the system with a built in vacuum attachment.

17. The method of claim 1, wherein during the step of mixing the mounting stage is moved linearly and rotationally.

18. The method of claim 1, wherein the receptacle is a powder canister having a storage portion and an applicator portion, wherein the storage portion and the applicator portion are in fluid communication with each other for delivering the custom powder formulation from the storage portion to the applicator portion, and wherein a pump depressible by a spring biased button at an end of the storage portion assists in transport of the custom powder formulation from the storage portion to the applicator portion.

19. The method of claim 1, wherein the powdered natural product is mica, white clay, bentonite clay, kaolin clay, silica calcium carbonate, or a combination thereof, and wherein the naturally occurring pigment is mineral based.

20. A custom powder dispensing method for use at a retail purchase site, comprising the steps of:
(a) providing a computer controlled automated powder dispensing apparatus including a plurality of containers storing different powder ingredients, wherein:
 1) at least one powder ingredient is a powdered natural product;
 2) at least one powder ingredient is a vitamin;
 3) at least one powder ingredient is a naturally occurring mineral based pigment;
(b) locating a user's face and various regions of the users body by the computer's software by scanning a region for a pattern of color or tone changes associated with the user's skin complexion;
(c) responding to the user's movement by providing real time image of the user's face and the various regions of the user's body on a viewing screen,
(d) storing the image of the user's face and the various regions of the user's body in the computer's memory so that the user may have free use of the face and the various regions of the user's body part while experimenting with different color choices;
(e) delivering information to the specific color choices selected by the user by the computer;
(f) inputting a custom powder formulation selection into the apparatus;
(g) retrieving ingredients proportion information associated with the selection from a database of the computer of the apparatus;
(h) outputting the ingredients proportion information associated with the selection so that a controller will dispense the appropriate predetermined proportion of the ingredients onto a receptacle;

(i) rotating the powder dispensing apparatus so that one of a plurality of dispensing assemblies is aligned with the receptacle;
(j) dispensing powder ingredients into the receptacle from the one of the plurality of dispensing assemblies, in a preselected amount according to the ingredients proportion information from the outputting step, at the retail purchase site, wherein at least one of the dispensed ingredients is the vitamin;
(k) placing a receptacle onto a mounting stage that is translatable;
(l) mixing the dispensed powder ingredients;
(m) repeating at least steps (b)-(l) for a different selection at the retail purchase site;
(n) packaging the dispensed mixed powder ingredients;
(o) accepting payment through a debit system, over the internet, or credit card;
(p) monitoring inventory of ingredients using the computer;
(q) notifying an operator of a reduction in the inventory via an internet system so that the operator is not needed to monitor inventory;
(r) providing the packaged dispensed mixed powder ingredients to a user by shipping to the user.

* * * * *

UNITED STATES PATENT AND TRADEMARK OFFICE
CERTIFICATE OF CORRECTION

| | | |
|---|---|---|
| PATENT NO. | : 8,636,173 B2 | |
| APPLICATION NO. | : 11/466653 | |
| DATED | : January 28, 2014 | |
| INVENTOR(S) | : Bartholomew et al. | |

It is certified that error appears in the above-identified patent and that said Letters Patent is hereby corrected as shown below:

In the Claims

Claim 4, Column 13, Line 22 and 23, Delete "over ever the internet, gar credit card." and insert --over the internet, or credit card--

Claim 11, Column 13, Line 61, Delete "wherein at east one" and insert --wherein at least one--

Claim 20, Column 14, Line 45, Delete "regions of the users body" and insert --regions of the user's body--

Signed and Sealed this
Twenty-seventh Day of May, 2014

Michelle K. Lee
*Deputy Director of the United States Patent and Trademark Office*